Dec. 4, 1956 K. H. HANSEN Re. 24,248

INDEPENDENT VEHICLE WHEEL SUSPENSIONS

Original Filed Nov. 4, 1952 3 Sheets-Sheet 1

Inventor
Kai H. Hansen
By Paul Fitzpatrick
Attorney

INDEPENDENT VEHICLE WHEEL SUSPENSIONS

Original Filed Nov. 4, 1952 3 Sheets-Sheet 2

Inventor
Kai H. Hansen
By Paul Fitzpatrick
Attorney

INDEPENDENT VEHICLE WHEEL SUSPENSIONS

Original Filed Nov. 4, 1952 3 Sheets-Sheet 3

Inventor
Kai H. Hansen
By Paul Fitzpatrick
Attorney

United States Patent Office

Re. 24,248

Reissued Dec. 4, 1956

24,248

INDEPENDENT VEHICLE WHEEL SUSPENSIONS

Kai H. Hansen, Detroit, Mich., assignor to General Motors Corporation, Detroit, Mich., a corporation of Delaware Original No. 2,731,257, dated January 17, 1956, Serial No. 318,701, November 4, 1952. Application for reissue September 24, 1956, Serial No. 611,802

1 Claim. (Cl. 267—8)

Matter enclosed in heavy brackets [ ] appears in the original patent but forms no part of this reissue specification; matter printed in italics indicates the additions made by reissue.

This invention relates to wheel suspensions and more particularly to the independent suspensions for the front wheels of motor vehicles.

In vehicle suspensions it is desirable to have associated therewith shock absorbing means which will function effectively throughout the entire range of movement of the associated wheel both in compression and rebound. During operation of motor vehicles, particularly over rough roads, the wheels and the suspensions supporting them are subject to a multiplicity of different forces which tend to create various vibrations and stresses in the operating parts. Various types of springs and shock absorbers have been provided to lend flexibility to the structure and to improve the ride qualities thereof. Stabilizer units also are employed to prevent undue sway of the vehicle under operating conditions. Modern motor vehicles employ all of these devices. However, while they operate to improve the ride qualities, in many cases the arrangement thereof is such as to cause unbalanced forces to be imposed on the parts which subject the control arms to undue twisting forces particularly during operation of the vehicle over bumpy roads.

One object of the present invention is to provide an independent suspension for vehicle wheels wherein the forces acting thereon are substantially balanced and undesirable stresses on the parts reduced to a minimum.

Another object is to provide a control arm for independent suspensions having a novel mounting means associated therewith for the shock absorber, the suspension spring and the vehicle stabilizer bar.

A further object is to provide an independent suspension which is simple in construction, economical in manufacture, and highly efficient in operation.

Other and further objects will become apparent as the description of the invention progresses.

Figure 1:
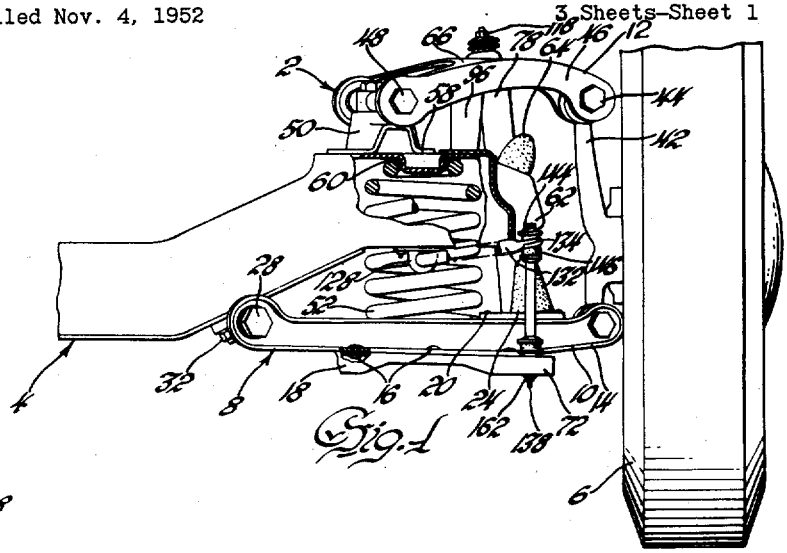
Fig. 1 is a side elevational view of the front portion of a motor vehicle showing the independent suspension comprising the present invention.

Referring to the drawings, the numeral 2 indicates a fragmentary portion of the front end of a motor vehicle having a supporting framework 4 and a road wheel 6 operatively connected to said framework by means of an independent suspension indicated generally at 8. As shown more particularly in Fig. 1, suspension 8 comprises a lower control arm 10 and an upper control arm 12. Control arm 10 consists of a pair of substantially channel shaped arm members 14, 14 which diverge in the direction of wheel 6 and which have secured to the lower flanges thereof in any suitable manner, such as by rivets 16, a mounting plate 18. The upper flanges of arms 14, 14 have secured thereto near the converging ends thereof by rivets 20, or other suitable means, a mounting plate 22 for a resilient bumper element 24. The inner or divergently disposed ends of arms 14, 14 are provided with relatively parallel portions 26, 26 having aligned internally threaded apertures therein for receiving the externally threaded inner ends of sleeves 28, 28. The ends of a supporting bolt 30 extend into the hollow interior of sleeves 28, 28 and form a pivotal support for the inner or left-hand ends of arms 14, 14. Rod retaining brackets 31 integral with bolt 30 are provided with apertures for receiving bolts 32 for attaching the said bar to the under surface of frame 4. The opposite or convergingly disposed ends 34 of arms 14, 14 are also bent so as to lie in substantially parallel relation and are provided with aligned apertures for receiving a bolt 36. An externally threaded sleeve 38 is mounted on bolt 36 between portions 34, 34, and receives the lower internally threaded end 40 of a knuckle 42. A wheel axle, not shown, is pivotally connected to knuckle 42 by means of a king pin in the usual fashion. The upper end of knuckle 42 is similarly provided with an internally threaded opening which receives an externally threaded bolt 44 extending through aligned apertures provided at the outer bifurcated end 46 of upper control arm 12. The inner or bifurcated left-hand end of control arm 12 is pivotally supported on a bolt 48 secured to a bracket 50 which in turn is secured to the upper surface of frame 4.

A coil spring 52 is seated at its lower end in a substantially circular depression 54 formed centrally of supporting plate 18. A substantially annular resilient spring seat 56 is disposed between spring 52 and plate 18. The upper end of spring 52 surrounds a spring seat 58 secured to and depending from the upper portion of frame 4. An annular resilient member 60 is disposed between the upper end of spring 52 and seat 58 which with resilient member 56 form insulators between the spring 52 and its seats and thereby prevent noise due to a metal to metal contact of the parts.

Bumper 24 is adapted to engage the end portion 62 of frame 4 when the wheel 6 has moved upwardly to substantially its upper limit of movement. A second resilient bumper 64 is provided on frame 4 and is adapted to engage the under surface of the central portion 66 of upper control arm 12 when the rebound movement of wheel 6 has substantially reached its downward limit of movement.

Figure 2:
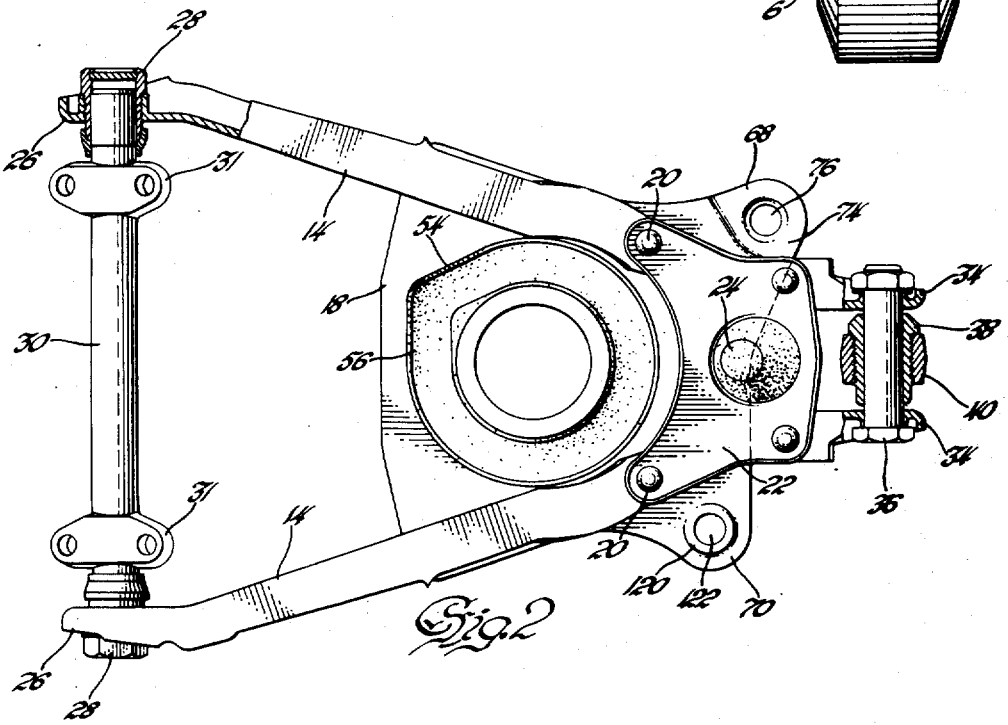
Fig. 2 is a plan view, partly in section, of the lower control arm of an independent suspension, certain parts being broken away to more clearly illustrate the structure of certain features thereof.
Figure 3:
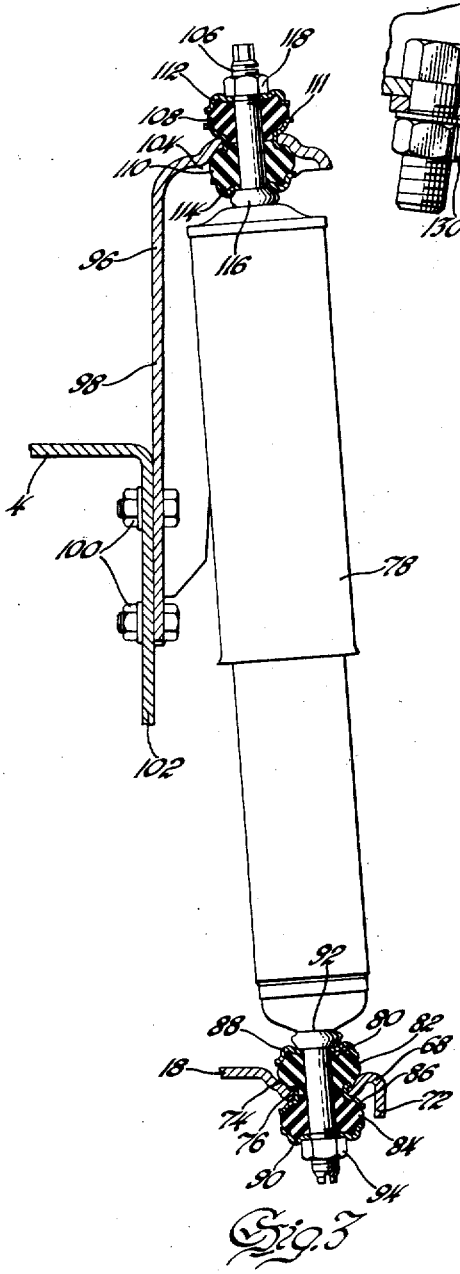
Fig. 3 is a side elevational view, partly in section, of a shock absorber showing the novel mounting means therefor.
Figure 6:
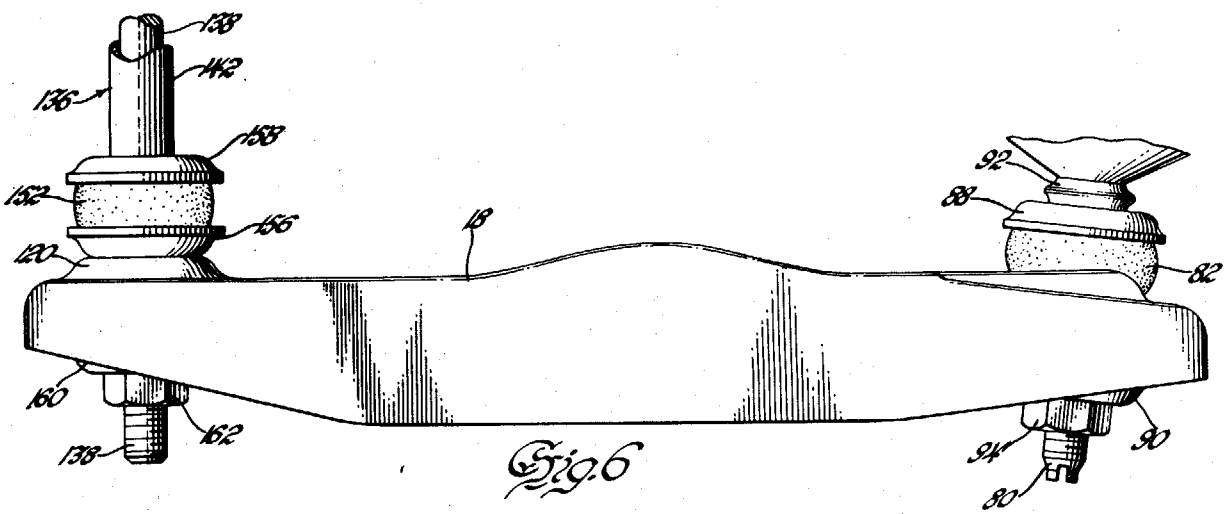
Fig. 6 is a front elevational view of the mounting plate showing the shock absorber and stabilizer unit mounted thereon.

As shown more particularly in Fig. 2, mounting plate 18 has provided near the right or outer end thereof at opposite sides of arms 14, 14 a pair of extensions 68 and 70 integral with said mounting plate. To add rigidity to the mounting plate the outer edge thereof is bent downwardly to form a substantially vertical flange 72 which extends around the perimeter thereof. Extension 68 is depressed as shown at 74 and is provided with an aperture 76 centrally thereof to provide a suitable mounting for the lower end of a telescopic type shock absorber 78. As shown more particularly in Fig. 3, shock absorber 78 has provided at the lower end thereof a bolt 80 which extends through aperture 76. Grommets 82 and 84 are disposed at either side of the apertured depressed portion 74 and are held in proper position by an annular retainer 86 mounted in aperture 76 and upper and lower retainers 88 and 90. Upper retainer 88 engages a fixed abutment 92 near the upper end of bolt 80 and retains the upper portion of grommet 82 against undue lateral expansion, the lower portion of said grommet being supported in the recess or depression 74 of extension 68. Retainer 90 is disposed at the lower end of grommet 84, the upper portion of said grommet being supported by central retainer 86. The parts are held in the position shown in Fig. 3 by a nut 94 which is threadedly secured to the lower end of bolt 80. The upper end of shock absorber 78 is similarly mounted in a bracket 96 which partially surrounds the upper portion thereof and acts as a shield therefor. The substantially vertical wall 98 of bracket 96 is secured by bolts 100 to a substantially vertical flange 102 of framework 4. The upper end of bracket 96 substantially surrounds the upper end of shock absorber 78 and is provided with a depression 104 therein having an aperture disposed centrally thereof through which a bolt 106 secured to the upper end of shock absorber 78 extends. Grommets 108 and 110 are disposed at opposite sides of depression 104, grommet 108 being retained by retainers 111 and 112. Retainer 111 is secured in the aperture provided in depression portion 104 and supports the lower end of grommet 108 while retainer 112 supports the upper end thereof. A third retainer 114 supports the lower end of grommet 110 and is disposed at the upper end of seat member 116. The parts are secured in position by tightening a nut 118 which engages the upper threaded end of bolt 106. Depressed portion 74 of extension 68 inclines slightly from a horizontal plane, as shown more particularly in Fig. 6, to properly align the lower support for the shock absorber with the upper support which is offset somewhat therefrom.

Figure 4:
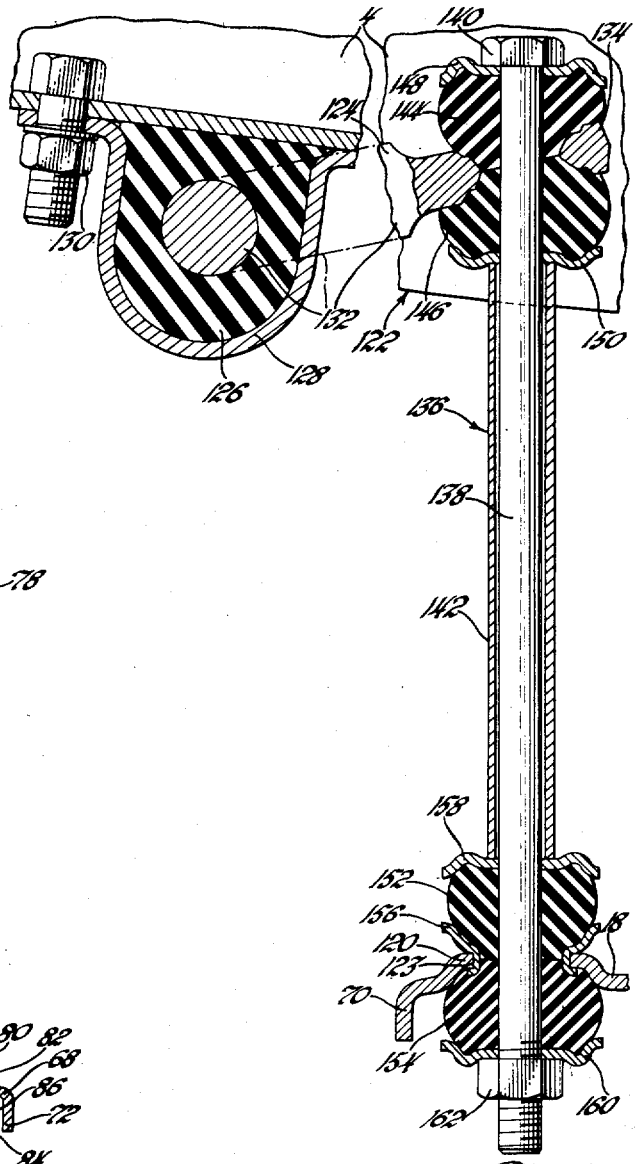
Fig. 4 is a front elevational view, partly in section, showing the stabilizer unit and the mounting means therefor.
Figure 5:
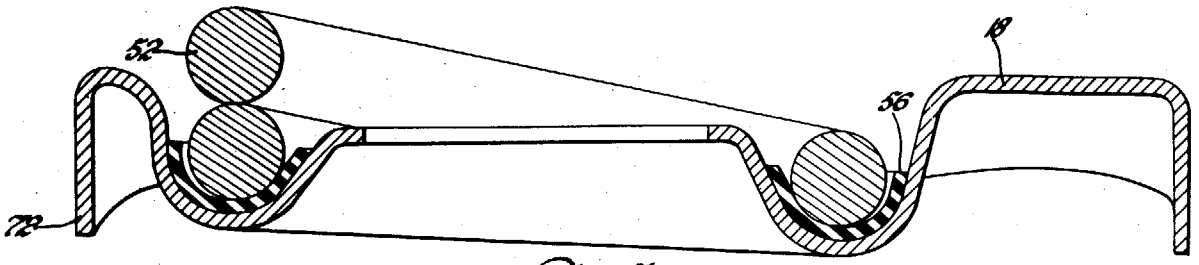
Fig. 5 is a transverse sectional elevational view of the mounting plate for the suspension spring, shock absorber and stabilizer.

Extension 70, as shown more particularly in Fig. 4, provides a mounting support for the stabilizer unit indicated generally at 122. Stabilizer unit 122 comprises a torsion spring bar member 124 which is mounted in a resilient supporting element 126 provided within a bracket 128 secured by bolts 130 or other means to the frame 4. Bar member 124 is bent as shown at 132 and the outer end thereof is provided with an eye 134 for receiving the upper end of an operating member 136. Operating member consists of an elongated bolt 138 having a head portion 140 at the upper end thereof and an elongated sleeve 142. A pair of grommets 144 and 146 are disposed at either side of the eye portion 134, the upper end of grommet 144 being retained in position by a retainer 148 disposed immediately beneath head 140 of bolt 138. The lower grommet 146 is retained in position by a second retainer 150 which engages the upper end of sleeve 142. Bolt 138 extends through the aperture 123 in extension 70 and a pair of grommets 152 and 154 are disposed at either side of the upwardly pressed boss portion 120 of said extension. Grommet 152 is held in position by a retainer 156 mounted in aperture 123 and at the upper end by a second retainer 158 which engages the lower end of sleeve 142. Grommet 154 is retained at the upper end in the depression disposed beneath boss 120 and at the lower end by a retainer 160. A nut 162 engaging the lower threaded end of bolt 138 when tightened draws the parts into the operative position shown in Fig. 4. Only one end of stabilizer unit 122 is shown herein, it being apparent to those skilled in the art that the portion thereof mounted in brackets 128 extends transversely of the front end of the vehicle and the opposite side is similar to that shown in Fig. 4 and is supported on a mounting plate 18 of the suspension associated with the opposite wheel.

From the foregoing description it is seen that when operating a vehicle, especially over bumpy roads, upon movement of a wheel 6 upwardly, the forces imposed on the mounting plate secured at lower side of control arms 14, 14 will be substantially balanced. The resistance to such movement is substantially the same at both sides of the mounting. The suspension spring 52 is disposed substantially midway between the mounting connections on the mounting plate. The forces tending to twist or otherwise distort the suspension, particularly the lower arm thereof, are thus reduced to a minimum. Undue strains and the undesirable reactions resulting therefrom during operation of a vehicle are thus also reduced to a minimum. It will also be observed that the mounting plate 18, including the extensions 68 and 70, is made of sheet metal and may be stamped from blank forms and thus manufactured at a low cost. It is also seen that by the nature of the structures described, rapid assembly thereof is possible with a further reduction in the cost of manufacture thereof.

While but a single embodiment has been shown and described herein, it will be apparent to those skilled in the art that changes in structural details might be made without departing from the invention. It therefore is to be understood that it is not intended to limit the invention to the single embodiment disclosed but only by the scope of the claim which follows.

I claim:

In an independent wheel suspension, the combination of a frame, a pair of vertically spaced wishbone control arms pivotally connected at one of their ends to said frame, a wheel supporting member pivotally mounted on the other ends of said arms, a mounting plate carried by the lower of said control arms and having an integral extension extending beyond each of the opposite side edges of said arm, a substantially vertically disposed rectilinearly operating shock absorber operatively connected to one of said extensions and to said frame, a vehicle stablizing torsion bar operatively connected to the other of said extensions and to said frame, a [coil] spring disposed between said mounting plate and said frame, said spring engaging said mounting plate [at points disposed] between the points of attachment thereon of said shock absorber and stabilizing torsion bar, and a seat formed in said mounting plate supporting said spring.

References Cited in the file of this patent or the original patent

UNITED STATES PATENTS

| | | |
|---|---|---|
| 2,148,177 | Sherman | Feb. 21, 1939 |
| 2,169,969 | Allison | Aug. 15, 1939 |
| 2,190,298 | Slack | Feb. 13, 1940 |
| 2,255,370 | Tydelski | Sept. 9, 1941 |
| 2,344,896 | Phelps | Mar. 21, 1944 |
| 2,414,674 | Slack et al. | Jan. 21, 1947 |